Nov. 18, 1958　　　D. L. JOHNSON　　　2,860,488
FISH MIGRATION APPARATUS FOR HIGH DAMS
Filed Feb. 11, 1953　　　　　　　　　　　4 Sheets-Sheet 1
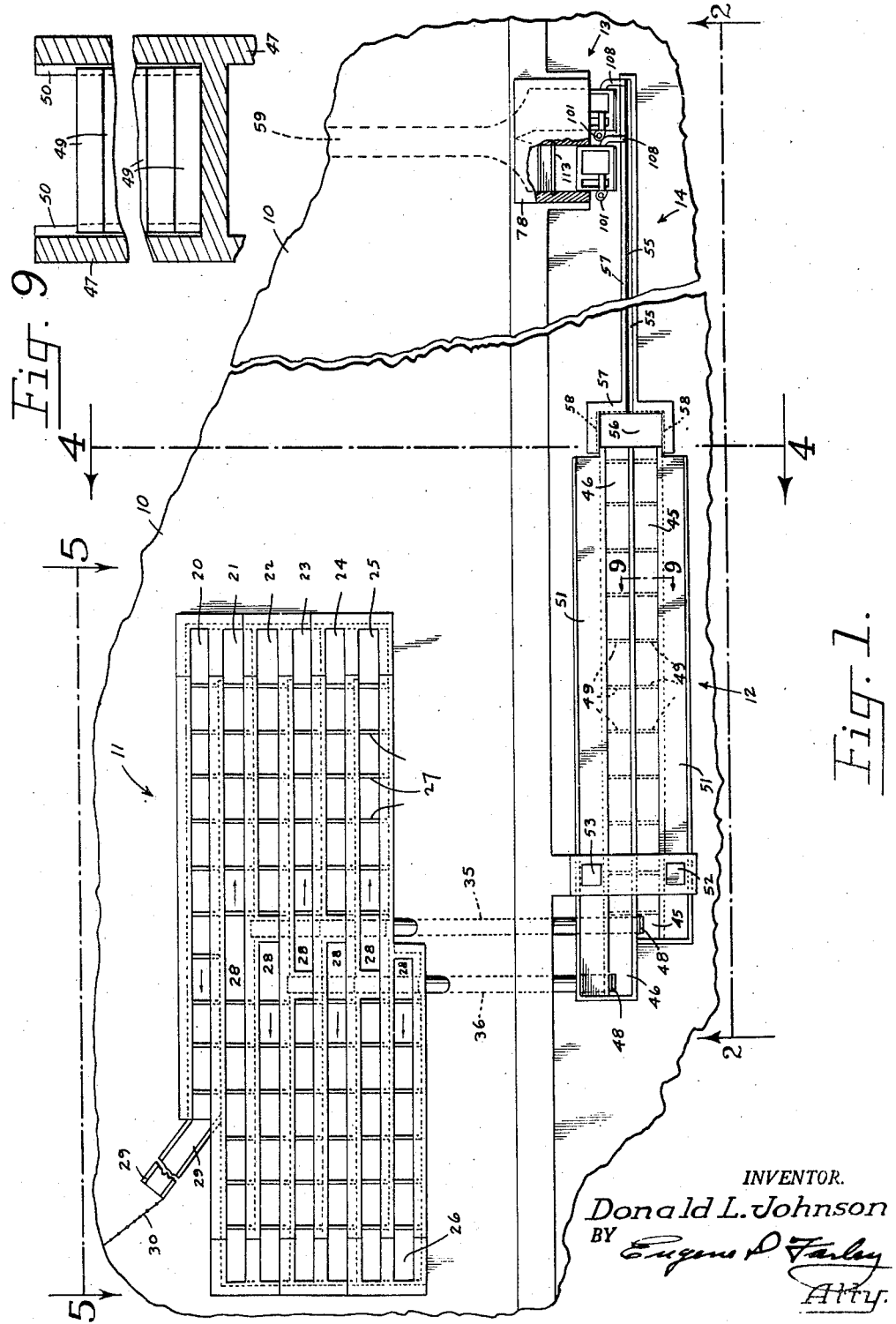
INVENTOR.
Donald L. Johnson
BY Nov. 18, 1958  D. L. JOHNSON  2,860,488
FISH MIGRATION APPARATUS FOR HIGH DAMS
Filed Feb. 11, 1953  4 Sheets-Sheet 2
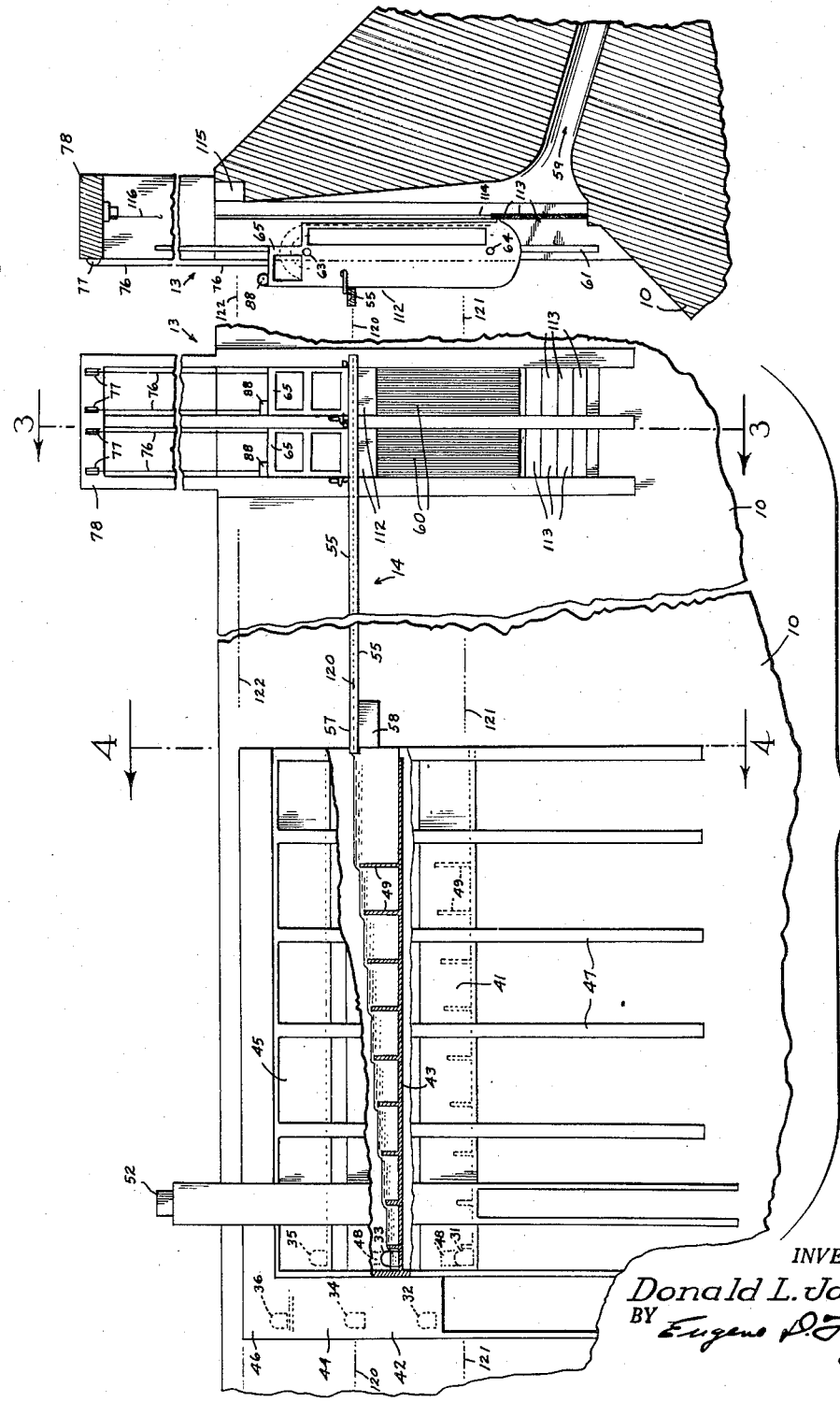
INVENTOR.
Donald L. Johnson
BY *Eugene D. Farley*
*Atty.*

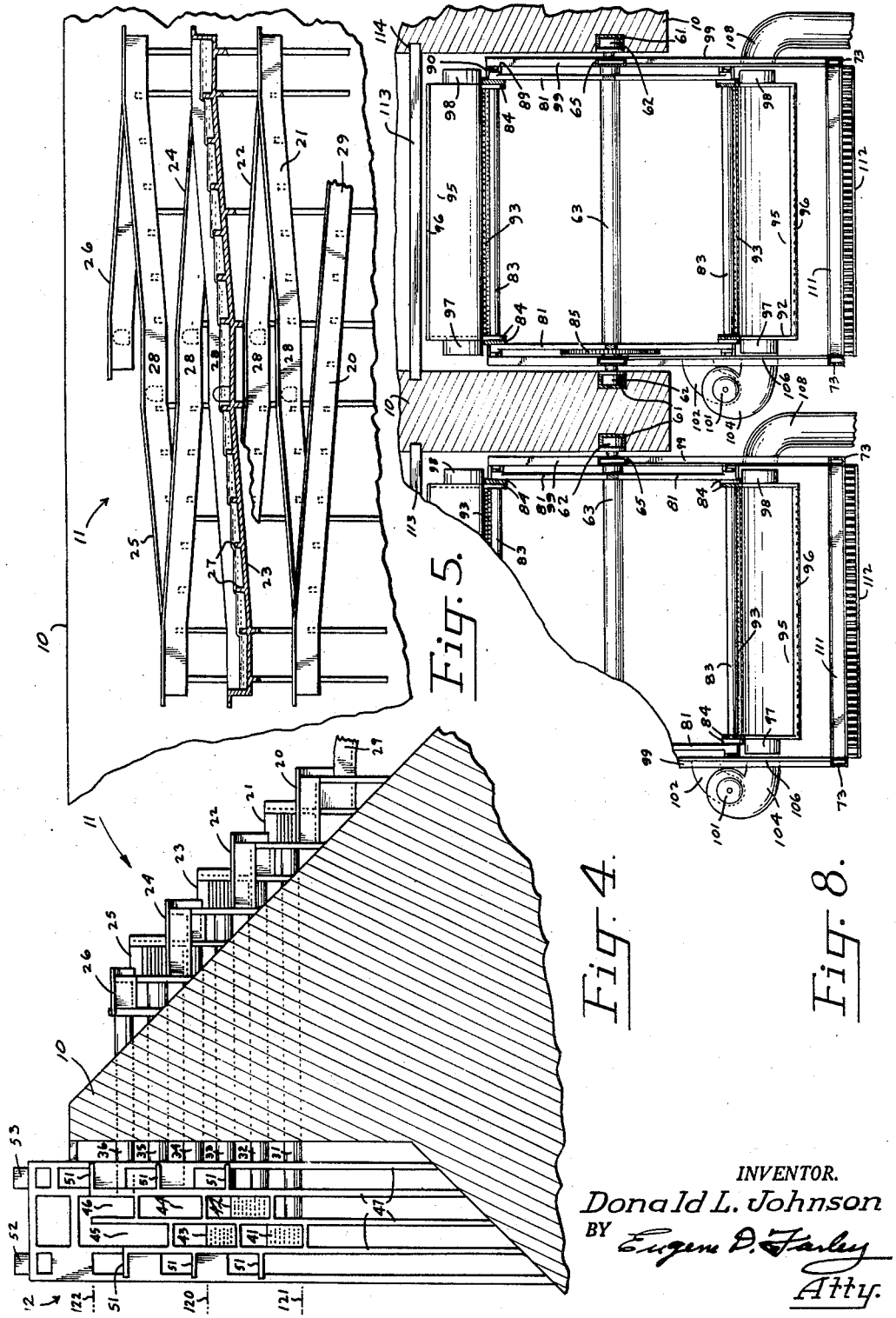

Nov. 18, 1958  D. L. JOHNSON  2,860,488
FISH MIGRATION APPARATUS FOR HIGH DAMS
Filed Feb. 11, 1953  4 Sheets-Sheet 4

INVENTOR.
Donald L. Johnson
BY
Atty.

United States Patent Office 2,860,488
Patented Nov. 18, 1958

2,860,488

FISH MIGRATION APPARATUS FOR HIGH DAMS

Donald L. Johnson, Tacoma, Wash.

Application February 11, 1953, Serial No. 336,237

10 Claims. (Cl. 61—21)

This invention pertains to fishways, and relates particularly to apparatus which affords the natural migration of fish through a dam under conditions which simulate the natural characteristics of water flow to which the fish are accustomed.

This application is a continuation-in-part of my now abandoned earlier application, Serial No. 261,941, filed December 17, 1951, and entitled Means for Safe and Natural Migration of Fish Through a Dam.

The anadromous variety of fish, such as the salmon and certain species of trout, spawn in the beds of fresh water streams. The eggs hatch and grow into fingerlings which instinctively migrate downstream and generally travel to the sea. After a period of time the mature survivors migrate upstream, being directed by an unknown but strong homing instinct, to the very place from which they came. Here they spawn, thereby completing the life cycle.

It is well-known that the downstream migrants, such as the salmon fingerlings and steelhead trout, follow the gravity flow of water down to the sea. When the path of the stream is interrupted by a lake or other body of quiet water, these downstream migrants instinctively search out and utilize the outlet thereof in order to continue their journey to the sea. The upstream migrants, such as the mature salmon and steelhead, instinctively follow a path against the gravity flow of the stream.

Front the foregoing it is seen that the natural and instinctive migration habits of such fish basically involve the natural gravity flow of water. Thus, when a dam is constructed in a stream or river for such purposes as development of power or storage of water for industrial, municipal or irrigation purposes, a downstream migrant is attracted to the flow of water from the reservoir through the penstock to the turbines and outlet valves. This inherent attraction has been utilized to economic advantage, although with some undesirable results, in affording downstream migration through low dams. However, in high dams the substantial fluctuations in water pressure in the turbines and outlet valves renders this procedure impractical, for the fingerlings cannot survive such pressure changes.

Furthermore, the fish ladders which have been provided heretofore are inoperable during periods other than high water in the reservoir, and no attempt has been made to prevent fish from entering the outlet works except in a few instances where the water flow is relatively small.

Accordingly, it is a principal object of this invention to provide apparatus by which fish may migrate downstream or upstream through a dam under conditions which simulate the natural gravity flow of water in a stream, irrespective of the height of the dam and the level of water impounded thereby.

Another important object of the present invention is to provide apparatus by which the aforementioned conditions for migration are maintained substantially constant irrespective of the fluctuations in the level of water impounded by the dam.

It is also well-known that the anadromous variety of fish are adversely affected by substantial changes in the temperature of water and that they are best sustained in health and vigor when in cold water. Accordingly, it is another important object of this invention to provide, in fishway apparatus, means for preventing the warm surface water in the reservoir from entering the apparatus and flowing downstream therethrough.

A further important object of this invention is to provide, in fishway apparatus, means for preventing the fish ladders from freezing over in winter, thereby affording continuous operation of the apparatus throughout the year.

A further important object of the present invention is the provision, in apparatus of the aforementioned class, of means which performs the dual function of screening the opening of the penstock of the dam and simultaneously directing the downstream migrants to a path of water flowing by gravity to the stream below a dam.

Inasmuch as the waters impounded by the dam may contain fish of the non-migratory variety as well as those of the anadromous variety, it is a still further object of this invention to provide, in apparatus for the migration of fish through a dam, means by which the fish may choose whether to enter the downstream section of the apparatus or whether to avoid said section and thus remain above the dam.

The foregoing and many other objects and advantages of the present invention will appear from the following detailed description, taken in connection with the accompanying drawings, in which:

Figure 1 is a fragmentary foreshortened top plan view of a dam having incorporated therewith apparatus embodying the features of the present invention;

Figure 2 is a fragmentary foreshortened side elevation of the dam as viewed from the reservoir side substantially along the line 2—2 in Figure 1, a portion thereof being broken away to disclose details of construction of the apparatus of this invention;

Figure 3 is a fragmentary sectional view in elevation taken along the line 3—3 in Figure 2 and showing features of the screening and elevating apparatus embodied in the present invention;

Figure 4 is a fragmentary sectional view in elevation taken along the lines 4—4 in Figures 1 and 2 and showing the relation between the elements of the apparatus mounted on the reservoir and downstream sides, respectively, of the dam;

Figure 5 is a fragmentary side elevation as viewed along the line 5—5 in Figure 1 and showing the fish ladder section of the apparatus on the downstream side of the dam, portions thereof being broken away to disclose details of construction;

Figure 8 is a fragmentary sectional view taken along the line 8—8 in Figure 6; and Figure 9 is a fragmentary foreshortened sectional view taken along the line 9—9 in Figure 1 showing details of construction for the removable stop logs.

Figures 6, 7:
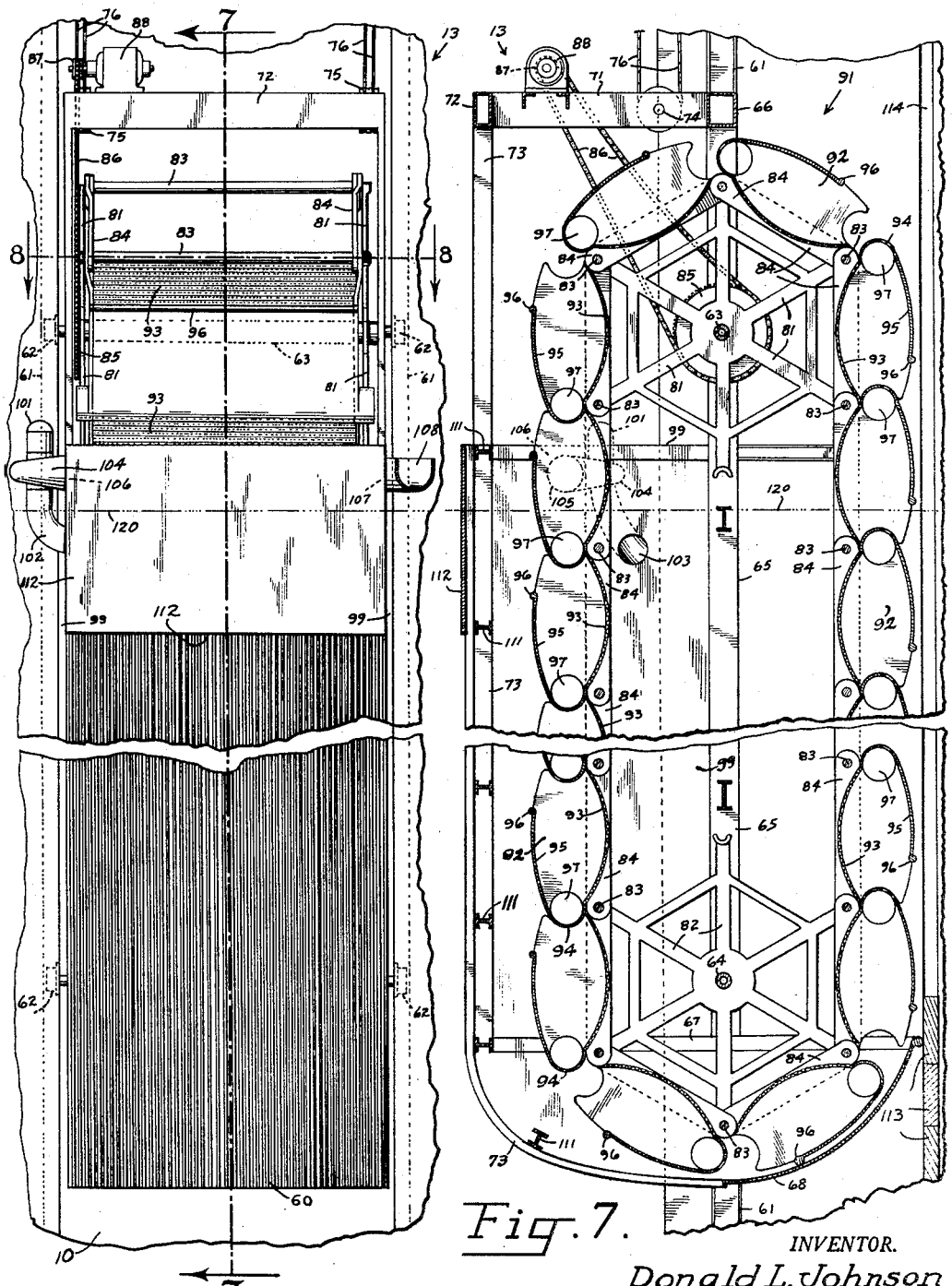
Figure 6 is a fragmentary foreshortened front elevation of the combination penstock screen and fish elevator mechanism of the apparatus, as viewed from the left in Figure 3.
Figure 7 is a fragmentary foreshortened sectional view taken along the line 7—7 in Figure 6.

Referring to the drawings, the apparatus of the present invention is shown, in combination with a dam 10, to include a fish ladder system 11 mounted on the downstream side of the dam, a fish staircase system 12 mounted on the reservoir side of the dam, the combination screen and elevator system 13 and the floating flume 14 interconnecting the elevator system and the upstream inlet of the staircase.

The fish ladder system 11 comprises a series of elongated trough-shaped ladder runs 20, 21, 22, 23, 24, 25, 26 arranged in switchbacks and sloping upwardly from the downstream outlet end. Each ladder run is provided with a plurality of spaced lateral stop logs 27 over which the water falls in its descent to the outlet. Intermediate the ends of each of the ladder runs 21, 22, 23, 24 and 25 and at the upper end of ladder run 26 is provided a level section 28 which functions as a resting pool for the fish in their ascent from the downstream waters.

The lower run of the ladder switchback is connected to a long ladder 29 which extends to the waters downstream of the dam. At the entrance to ladder 29 is provided a fish barrier 30 by which the upstream migrants are directed away from the outlet waters of the dam and into the lower entrance of the fish ladder system.

Individual passageways 31, 32, 33, 34, 35, 36 extend through the dam 10 and communicate at their downstream ends with the resting pools 28 in the respective ladder runs 21, 22, 23, 24, 25, 26. These passageways extend through the dam 10 on the reservoir side and each communicates with an elongated fish stairwell 41, 42, 43, 44, 45, 46, respectively, supported by the structural framework 47. A gate 48 (Figures 1 and 2) is provided for each passageway at the stairwell end in order to control the flow of water therethrough, as described in detail hereinafter. Each stairwell is also provided with a plurality of removable spaced transverse stop logs 49 (Figure 2) which are graduated in height, for example in one foot intervals, upwardly from the passageway end of each stairwell. Each stairwell thus provided with stop logs forms a fish staircase. Thus, water in the reservoir is permitted to cascade over each stop log in the downstream direction, as described in detail hereinafter.

It is to be noted that stairwells 41, 43, 45 are disposed one above the other, as are stairwells 42, 44, 46 which, also, are disposed adjacent and above the first named stairwells. Thus, as the level of water in the reservoir rises, it floods each staircase in succession and thereby accommodates a substantially constant flow of water downstream through the dam regardless of the height of water in the reservoir. As the water in the reservoir rises between the levels of succeeding staircases, stop logs 49 of successively increased height are placed in the stairwell of the appropriate staircase, thereby permitting ample water, for example one foot of depth, to cascade over each log, as best shown in Figure 2. It is understood, of course, that as each staircase is flooded the gate 48 in the one below it is closed to prevent water from flowing out through the submerged passageways. Stop logs are not installed in the stairwells above the water level and are removed from the staircases as the water level in the reservoir diminishes.

Because of the limited head space between the vertically disposed stairwells and also in order to facilitate handling, each bank of stop logs 49 is preferably built up from a plurality of individual logs stacked vertically in guideways 50 (Figure 9) provided in the side walls of each stairwell.

Access to the staircases, for such purposes as installing and removing stop logs 49, is afforded by means of walkways or driveways 51 provided adjacent each staircase. Elevators 52, 53 traverse the ways 51 to carry personnel and equipment to the various staircase levels.

The inlet ends of the stairwells are open, while the ends adjacent the passageways 31–36 are closed, as shown in Figures 1 and 2. A flume 55 floats upon the water in the reservoir and is disposed parallel to the dam with the enlarged end 56 adjacent the open ends of the stairwells. The flume comprises a pair of vertical walls and a bottom side and is open on its top side. The walls of the flume are attached to floats which serve also as walkways 57. The end 56 of the flume is open on its bottom side and is provided with large depending side plates 58 (Figure 2) which function as a temperature barrier in the manner fully explained hereinafter.

The end of the flume opposite end 56 is positioned in the proximity of the penstock 59 of the dam 10, through which penstock water is directed to turbines and other equipment (not shown). Adjacent the reservoir entrance to the penstock is located the combination screen and elevator mechanism 13, now to be described in detail.

In the structure of the dam 10 defining the opposite sides of each opening of the penstock 59 are the vertical guide channel members 61 which extend upwardly from below the penstock opening to a point above the upper level of the dam (Figure 3). These channel members receive roller wheels 62 which are mounted freely upon the ends of shafts 63 and 64 which are supported for rotation between the vertical frame members 65. The frame members 65 are secured in spaced relation by the top frame member 66 and the bottom frame meber 67, the latter also supporting the arcuate shield plate 68 which extends from the rear side, i. e. adjacent the penstock opening, to the central frame members 65.

Frame members 71 extend forwardly from the vertical frame members 65 and are secured together at their front ends by frame member 72. Vertical frame members 73 connect the members 71, 72 to the bottom frame member 67. A shaft 74 supported between the members 71, 72 carries pulleys 75. A cable 76 is reeved about each pulley and extends upwardly over pulleys 77 mounted on the tower 78 and thence to a power winch (not shown) located in the tower. Operation of the winch thereby raises or lowers the aforesaid framework along the guide channels 61.

A pair of spaced sprockets 81 are mounted upon the upper shaft 63 and a similar pair of sprockets 82 are mounted upon the lower shaft 64. An endless chain, comprising transverse rods 83 and connecting links 84, is mounted on the sprockets. A drive sprocket 85 is secured to upper shaft 63 and is connected through drive chain 86 to a second sprocket 87 mounted on the drive shaft of electric motor 88. This motor is mounted upon one of the frame members 71. Vertical channel guide members 89 are supported from the frame members 65 between the sprockets 81, 82 and adjacent the ends of the rods 83. These guide members are adapted to receive therein rollers 90 mounted on the ends of the rods 83, whereby to support the chain intermediate the sprockets 81, 82 and thereby prevent buckling of the chain system under the force of water flow toward the penstock.

Between each lateral pair of links 84 there is formed a basket 91. The basket comprises end walls which are formed by outwardly extending plates 92 secured, as by welding, to the pair of links. Between each pair of end walls and adjacent the inner edges thereof is secured an arcuate wire mesh screen 93. This screen extends substantially the distance between the connecting transverse rods 83 of each pair of links and thereby forms a substantially continuous, endless screen. Continuing arcuately downwardly and then outwardly and upward from the lower end of the screen is a metal sheet which forms the bowl 94 and front side 95 of the basket. The front side terminates below the upper end of the side walls and is formed with an outwardly rolled edge 96 which functions as a reinforcement for the front side of the basket. The rolled edge also closes the space between the arcuate bottom shield plate 68 and the basket, thereby preventing fish from passing therebetween and entering the penstock 59.

An opening is provided in the opposite end walls of each basket at the bowl end thereof and a tubular extension is secured to each wall surrounding the openings to form an inlet port 97 and an outlet port 98. The open ends of these ports are sealed by stationary side plates 99 when the baskets are in the forward side of the sprocket and chain mechanism, i. e. on the side facing the reservoir.

These side plates 99 are secured to the frame members 65 and 73 and extend upwardly from the front edge of the arcuate plate 68 to a point near the top sprocket shaft 63 (Figure 7).

Mounted upon the side plate 99 adjacent the inlet ports 97 of the baskets 91 is a water pump 101. The intake port 102 of the pump extends downwardly and inwardly toward the vertical frame members 65 and communicates with an opening 103 in the said side plate 99. In this manner the pump takes in water which is confined within the enclosing screens 93, and which, therefore, is free of fish and other objects. The flushing port 104 of the water pump communicates with an opening 105 in the upper central portion of the side plate 99, said opening 105 being arranged for registration with the inlet port 97 of each basket 91 as the latter is rotated upwardly along the side plate 99.

Similarly, an opening 107 is provided in the other side plate 99 adjacent the outlet port 98 of the baskets 91 and is arranged for registration therewith when the opening 105 and inlet port 97 are in registry. Secured to the side plate and extending from opening 107 is a spout 108 which extends to the floating flume 55, for purposes to be explained hereinafter.

In order to protect the baskets 91 from damage by logs and other heavy debris carried in the reservoir, a trash rack is mounted in front of the basket assembly. This rack comprises a network of horizontal beams 111 secured to the spaced vertical frame members 73. As shown in Figure 7, the members 73 may be extended arcuately downward to the front edge of the bottom shield plate 68.

A large metal plate 112 is supported by the trash rack and is positioned to extend downwardly in front of the trash rack from the upper level 106 of the side plates 99. This plate 112 functions as a temperature barrier in the manner explained in detail hereinafter.

It is to be observed that the traveling screen and elevator unit is adjustable vertically by cables 76. This control makes possible the positioning of the spout 108 slightly above the level of the water in the reservoir and thus positions the spout properly with respect to the floating flume 55 and the water surface elevation. When the screen unit is raised above the lower level of the penstock opening, stop logs 113 are lowered, in the end guide grooves 114, to close off the unscreened portion of the forebay. The stop logs 113 are stored in compartment 115 provided in the dam adjacent the tower 78 and manipulated by the power driven cable hoist 116.

The size and arrangement of the apparatus described hereinbefore may be varied within wide limits to accommodate use on various sizes of dams. For example, a typical installation of the apparatus illustrated may be the following: Let it be assumed that the seasonal fluctuation in the level of water impounded by the dam 10 from its lowest level 121 to its highest level 122 (Figures 2 and 4) is 72 feet. Accordingly, the six stairwells 41-46 are designed to accommodate a twelve foot variation in water level and the stop logs 49 within a stairwell are constructed to increase one foot in height successively from the passageway toward the flume. In this manner the staircase assembly accommodates a total water fluctuation of 72 feet in increments of one foot.

The combination screen and elevator mechanism 13 for the above exemplified installation is preferably constructed as follows: The over-all height of the mechanism, i. e. from the bottom shield plate 68 to the frame 71 is about 90 feet. The sprocket pairs 81, 82 are about 12 feet in diameter and spaced apart sufficiently, for example 15 feet, so that the basket screens 93 will cover the width of the reservoir opening to penstock 59, and the baskets 91 are about six feet deep. The screens 93 may, for example, have four to eight meshes per lineal inch and may travel continuously at a rate of about 5 feet per minute. The screens are backwashed above the water level by jets of water to clean them of adhering matter collected from the water of the reservoir. The front opening of each basket above the rolled edge 96 is about one and one-quarter feet. The metal temperature barrier plates 58 and 112 are preferably dimensioned to extend about ten feet below the surface of the water impounded by the dam. These plates may be of wood or other material.

The operation of the apparatus is as follows: The operator adjusts the vertical position of the screen unit 13 with respect to the level 120 of water impounded by the dam 10 so that the spout 108 is positioned slightly above the upper edge of the flume 55. In the position of water level shown in the drawings the gates 48 of passageways 31 and 32 are closed, because they are below the water level. Thus, water enters the staircase 43 and cascades downwardly over the nine stop logs 49 and passes through passageway 33 into ladder run 23 and thence downwardly to the stream below. The stop log 49 at the passageway end of the staircase is proportioned to reduce the level of water flowing through the passageway so as not to fill the latter, thereby insuring against damage to the fish by pressures induced by water hammer.

Fish migrating upstream are directed away from the outlet waters of the dam by the fish barrier 30 and enter the ladder run 29 and progress upwardly over the stop logs 27 of the switchback ladders to the resting pool 28 of ladder run 23. Since no water is flowing from the upper runs 24-26 the fish swim through passageway 33 and pass upwardly over the stop logs 49 into the enlarged end 56 of the flume 55. In this area there is a water current under the temperature barrier 58 induced by the flow of cold water below the barrier into the staircase 43. Thus, the upstream migrant inherently seeks to travel against this current and accordingly swims under the barrier and into the reservoir from which it travels further upstream.

It is to be pointed out here that the temperature barrier 58 also functions to prevent the water in the staircases from freezing over in winter. This advantage is achieved by the fact that as water is cooled below 39° F. its density decreases and therefore the barrier prevents this cold surface water from circulating downwardly under it and entering the staircase, in the same manner as it prevents the warm surface water in summer from entering the staircase. Thus, in winter the staircase is provided with water warmer than the reservoir surface and in summer with water cooler than the reservoir surface, whereby continuous and substantially uniform operation of the fishway throughout the year is assured.

Downstream migrants in the reservoir are attracted to the flow of water through the trash racks and into the screen buckets to the penstocks 59, and thus they are caught up in the baskets 91. Since the elevator mechanism is 90 feet in length, it will collect fish swimming at substantially all levels in the reservoir. The fish enter the baskets through the space between the rolled edge 96 and the bowl 94 of the basket next above. The water rushes through this opening at a velocity substantially greater than is the velocity of the water passing outward through the screen back 93 and consequently the fish are forced, with ample safety against harm, into the bowl 94 at the bottom of the basket. As the screen unit continues its travel the fish are elevated slowly, and thereby decompressed slowly, to the upper edge of the side plates 99. The barrier 112 functions to prevent the warm surface water in the reservoir, which remains on the surface because of its lower density, from reaching the fish in the baskets. The fish are retained in the basket during ascent of the latter by means of the aforementioned velocity of water flow obliquely downward through the basket. As the rolled edge 96 of the basket front 95 breaks above the surface of the water, the water in the upper part of the basket drains out through the screen 93 to trap the fish in the basket, but sufficient water remains in the bowl 94 to contain the fish. When the basket ports 97, 98 reach the level of the water pump flushing port 104 and spout 108, a large volume of water of relatively low velocity is expressed from the port 104, flushing the fish out through the spout 108 into the floating flume 55. The fish then pass along the floating flume to the enlarged end 56 from whence they follow the water flow down the staircase 43, through passageway 33 and down the ladder runs 23–20 to the stream below.

From the foregoing it will be seen that the apparatus of the present invention provides for the migration of fish with safety and efficiency and in a manner similar to the natural characteristics of a flowing stream. The apparatus is readily adaptable to existing and contemplated high dam constructions, and is operated with a minimum of personnel and power equipment.

It will be apparent to those skilled in the art that various changes may be made in the structural details described hereinbefore without departing from the scope and spirit of this invention. Accordingly, the foregoing description is to be considered primarily as illustrative of the invention and is not to be construed in a limiting sense.

Having now described my invention and the manner in which the same may be used, what I claim as new and desire to secure by Letters Patent is:

1. A fishway comprising, in combination with a dam, an inclined fish ladder on the downstream side of the dam, a plurality of vertically disposed elongated staircases on the reservoir side of the dam, each staircase including side and bottom walls and being open at one end and closed at the other end, a plurality of passageway means extending through the dam and each connecting a staircase at the closed end to a different level of the fish ladder, gate means in each passageway means for releasably sealing the latter, and a plurality of transverse wall means arranged at longitudinally spaced intervals in each staircase in progressively ascending height away from the passageway means.

2. A fishway comprising, in combination with a dam having a penstock therein, an inclined fish ladder on the downstream side of the dam, passageway means extending through the dam and communicating with the fish ladder, vertically adjustable bucket conveyor means positioned in front of the penstock opening on the reservoir side of the dam for elevating fish from the depths of the reservoir to the surface of the reservoir and including a plurality of buckets having perforated backs forming a continuous screen, and means including a floating flume extending between the bucket conveyor means and the passageway means for directing the fish discharged from the bucket conveyor means to the passageway means for downstream migration, the opposite sides of the buckets having openings therein communicating in one position with hydraulic flushing means and outlet spout means, respectively, the spout means also communicating with the floating flume.

3. A fishway comprising, in combination with a dam having a penstock therein, an inclined fish ladder on the downstream side of the dam, a plurality of vertically disposed elongated staircases on the reservoir side of the dam, each staircase including side and bottom walls and being open at one end and closed at the other end, a plurality of passageway means extending through the dam and each connecting a staircase at the closed end to a different level of the fish ladder, gate means in each passageway means for releasably sealing the latter, vertically adjustable screen means positioned in front of the penstock opening on the reservoir side of the dam, vertically adjustable bucket conveyor means associated with the screen means for elevating fish from the depths of the reservoir to the surface of the reservoir, and a floating flume disposed upon the water in the reservoir and extending between the open ends of the staircases and the bucket conveyor means, the end of the flume adjacent the staircases being open on its bottom side.

4. The fishway of claim 3 including barrier means extending downwardly from the open bottom end of the flume a substantial distance into the water of the reservoir to prevent entrance into the passageway means of the surface water of the reservoir.

5. A fishway comprising, in combination with a dam having a penstock therein, an inclined fish ladder on the downstream side of the dam, a plurality of vertically disposed staircases on the reservoir side of the dam, a plurality of passageway means extending through the dam and each connecting a staircase to a different level of the fish ladder, gate means in each passageway means for releasably sealing the latter, vertically adjustable screen means positioned in front of the penstock opening on the reservoir side of the dam, vertically adjustable bucket conveyor means associated with the screen means for elevating fish to the surface of the reservoir, a floating flume disposed upon the water in the reservoir and extending between the staircases and the bucket conveyor means, the opposite sides of the buckets having openings therein communicating in one position with hydraulic flushing means and outlet spout means, respectively, the spout means also communicating with the floating flume.

6. A fishway comprising, in combination with a dam having a penstock therein, an inclined fish ladder on the downstream side of the dam, a plurality of vertically disposed staircases on the reservoir side of the dam, a plurality of passageway means extending through the dam and each conecting a staircase to a different level of the fish ladder, gate means in each passageway means for releasably sealing the latter, vertically adjustable bucket conveyor means positioned in front of the penstock opening on the reservoir side of the dam for elevating fish to the surface of the reservoir and including a plurality of buckets having perforated backs forming a continuous screen, a floating flume disposed upon the water in the reservoir and extending between the staircases and the bucket conveyor means, the opposite sides of the buckets having openings therein communicating in one position with hydraulic flushing means and outlet spout means, respectively, the spout means also communicating with the floating flume, the end of the flume adjacent the staircases being open on its bottom side, and barrier means extending downwardly from the open bottom end of the flume a substantial distance into the water of the reservoir to prevent entrance into the passageway means of the surface water of the reservoir.

7. A fishway comprising, in combination with a dam having a penstock therein, fish ladders on the downstream side of the dam and arranged in switchbacks, a plurality of vertically disposed fish stairwells on the reservoir side of the dam, a plurality of passageway means extending through the dam and each connecting a stairwell to a switchback of the fish ladder, gate means in each passageway for releasably sealing the latter, a plurality of spaced stop log means removably mounted in each stairwell and arranged therein in progressively ascending height away from the passageway means, vertically adjustable bucket conveyor means positioned in front of the penstock opening on the reservoir side of the dam for elevating fish to the surface of the reservoir and including a plurality of buckets having perforated backs forming a continuous screen, and a floating flume disposed upon the water in the reservoir and extending between the stairwells and the bucket conveyor means, the end of the flume adjacent the stairwells being open on its bottom side, the opposite sides of the buckets having openings therein communicating in one position with hydraulic flushing means and outlet spout means, respectively, the spout means also communicating with the floating flume.

8. The fishway of claim 7 including barrier means extending downwardly from the open bottom end of the flume a substantial distance into the water of the reservoir to prevent entrance into the passageway means of the surface water of the reservoir.

9. A fishway comprising in combination with a dam having a penstock therein, an inclined fish ladder on the downstream side of the dam, passageway means extending through the dam and communicating with the fish ladder, vertically adjustable screen means positioned in front of the penstock opening on the reservoir side of the dam, vertically adjustable bucket conveyor means associated with the screen means for elevating fish from the depths of the reservoir to the surface thereof, means including a floating flume extending between the bucket conveyor means and a passageway means for directing the fish discharged from the bucket conveyor means to the passageway means for downstream migration, the end of the flume adjacent the passageway means being open on its bottom side, and barrier means extending downwardly from the open bottom of the flume a substantial distance into the water of the reservoir to prevent entrance of the reservoir surface water into the passageway means.

10. A fishway comprising, in combination with a dam having a penstock therein, an inclined fish ladder on the downstream side of the dam, passageway means extending through the dam and communicating with the fish ladder, vertically adjustable screen means positioned in front of the penstock opening on the reservoir side of the dam, vertically adjustable bucket conveyor means associated with the screen means for elevating fish from the depths of the reservoir to the surface of the reservoir, and barrier means extending downwardly in front of the bucket conveyor means a substantial distance into the water of the reservoir to prevent entrance of the reservoir surface water into the bucket conveyor means.

References Cited in the file of this patent

UNITED STATES PATENTS

| | | |
|---|---|---|
| 1,524,667 | Middaugh | Feb. 3, 1925 |
| 1,573,785 | Albright | Feb. 16, 1926 |
| 1,903,627 | Koch | Apr. 11, 1933 |
| 2,125,311 | Peterson | Aug. 2, 1938 |
| 2,171,560 | Holmes et al. | Sept. 5, 1939 |

FOREIGN PATENTS

| | | |
|---|---|---|
| 319,833 | Great Britain | Oct. 3, 1929 |